(12) United States Patent
Konno et al.

(10) Patent No.: US 6,967,745 B1
(45) Date of Patent: Nov. 22, 2005

(54) IMAGE PROCESSING APPARATUS AND METHOD, AND STORAGE MEDIUM

(75) Inventors: Yuji Konno, Kawasaki (JP); Hisashi Ishikawa, Urayasu (JP); Hiroshi Tajika, Yokohama (JP); Miyuki Fujita, Tokyo (JP); Norihiro Kawatoko, Kawasaki (JP); Tetsuya Edamura, Kawasaki (JP); Tetsuhiro Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1103 days.

(21) Appl. No.: 09/645,318

(22) Filed: Aug. 25, 2000

(30) Foreign Application Priority Data

Aug. 27, 1999 (JP) ................................. 11-241718

(51) Int. Cl.⁷ .......................... G06F 15/00; G03F 3/08; G09G 5/02
(52) U.S. Cl. ........................ 358/1.9; 358/518; 358/523; 345/600; 345/605
(58) Field of Search ............................... 382/232, 235, 382/251, 276, 166, 162; 358/1.16, 3.01, 523, 358/539, 530, 426.06, 1.9, 518; 345/600, 345/605

(56) References Cited

U.S. PATENT DOCUMENTS

| | | | |
|---|---|---|---|
| 4,533,928 A | 8/1985 | Sugiura et al. | 346/140 R |
| 5,115,241 A | 5/1992 | Ishikawa | 341/143 |
| 5,162,925 A | 11/1992 | Takaoka et al. | 358/447 |
| 5,377,041 A * | 12/1994 | Spaulding et al. | 358/518 |
| 6,204,883 B1 * | 3/2001 | Tsukagoshi | 348/468 |

FOREIGN PATENT DOCUMENTS

| | | | |
|---|---|---|---|
| EP | 0 482 848 A2 | 4/1992 | H04N 1/64 |
| EP | 0 651 563 A1 | 5/1995 | H04N 1/41 |
| JP | 08-149307 | 7/1996 | |
| JP | 09-163142 | 6/1997 | |

* cited by examiner

Primary Examiner—Mark Wallerson
Assistant Examiner—Thomas J Lett
(74) Attorney, Agent, or Firm—Fitzpatrick, Cella, Harper & Scinto

(57) ABSTRACT

When highly redundant information that expresses five tones using 4 bits is transferred to a printer in terms of a unit data length in data transfer, efficiency is very poor. Hence, multi-valued data is quantized to 5-valued data, which is output as a 4-bit code that can express five values. 4-bit codes for three bits are combined to be converted into an 8-bit code. The 8-bit codes are packed into data of a 16-bit unit, and the packed data is transferred to the printer.

20 Claims, 13 Drawing Sheets

FIG. 6

| 3n+1 \ 3n | 000 | 001 | 010 | 011 | 100 |
|---|---|---|---|---|---|
| 000 | 00000 | 00101 | 01010 | 01111 | 10100 |
| 001 | 00001 | 00110 | 01011 | 10000 | 10101 |
| 010 | 00010 | 00111 | 01100 | 10001 | 10110 |
| 011 | 00011 | 01000 | 01101 | 10010 | 10111 |
| 100 | 00100 | 01001 | 01110 | 10011 | 11000 |

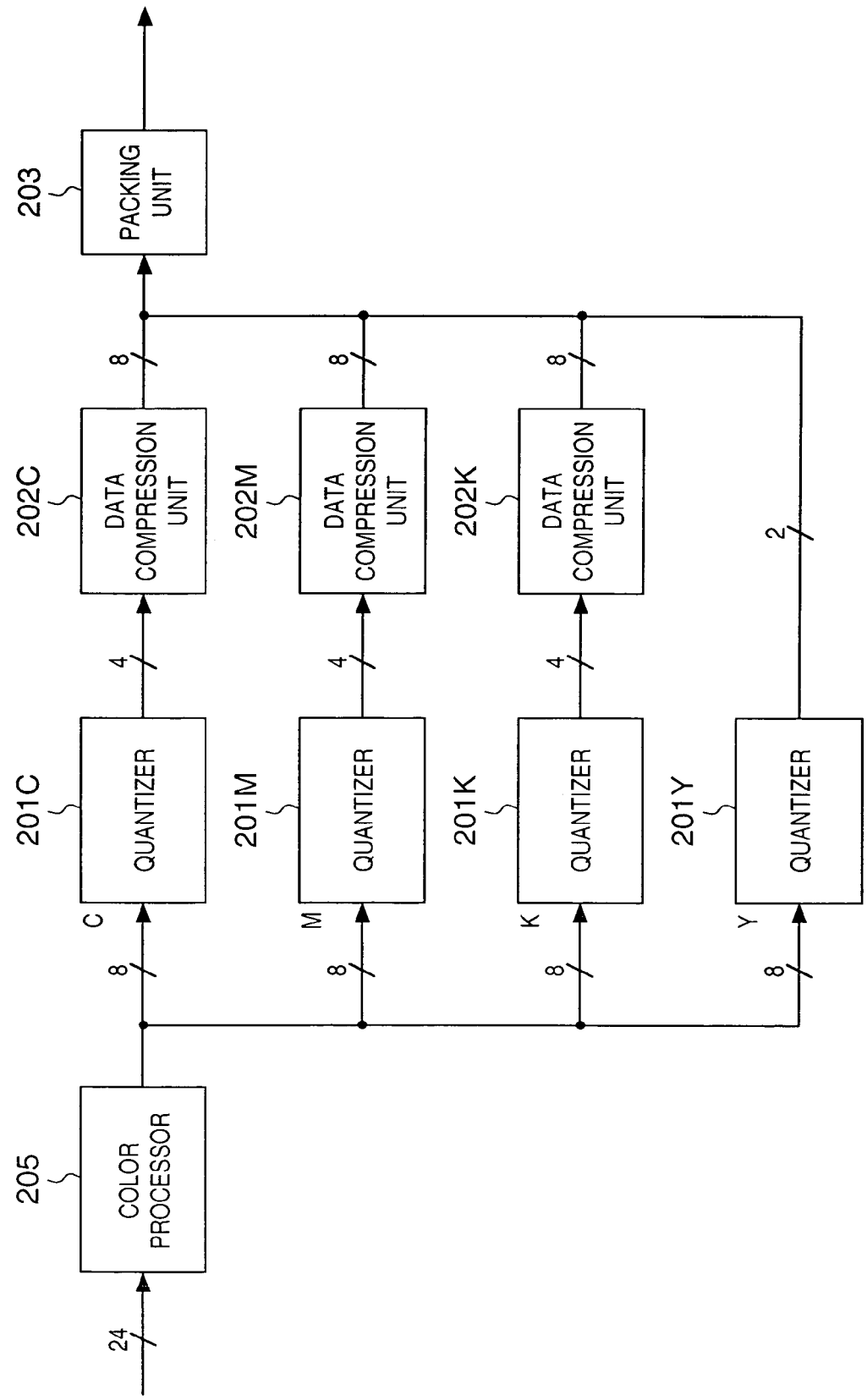

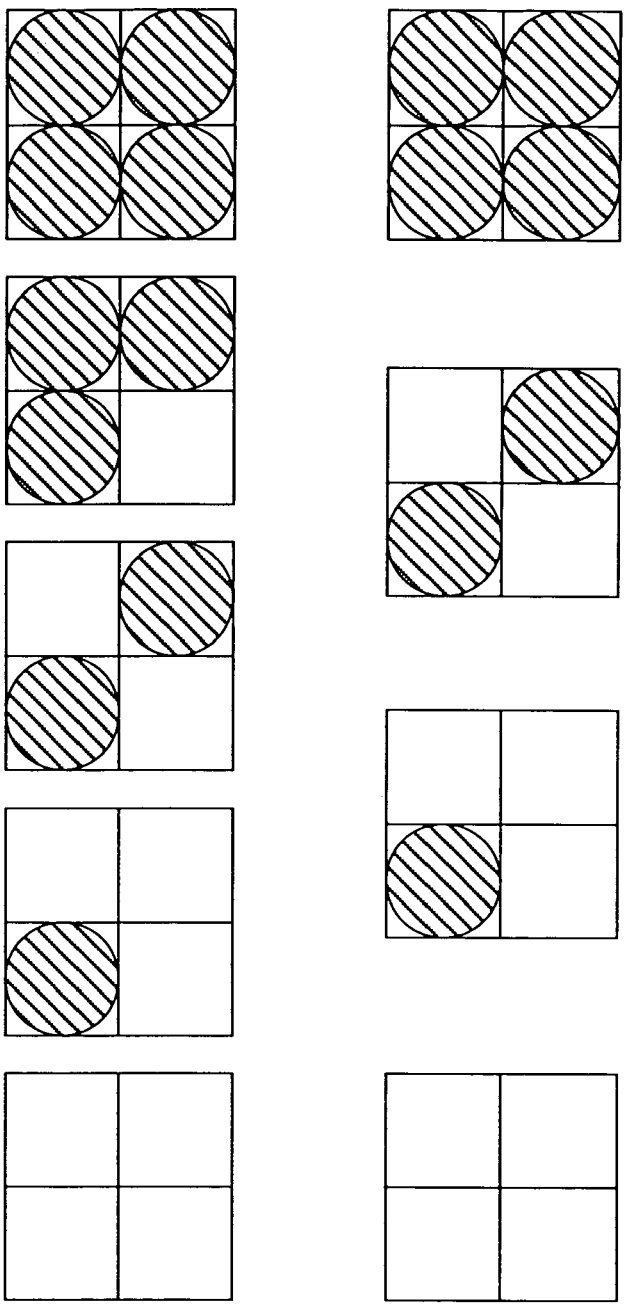

IMAGE PROCESSING APPARATUS AND METHOD, AND STORAGE MEDIUM

FIELD OF THE INVENTION

The present invention relates to an image processing apparatus and method, and a storage medium and, more particularly, to an image processing apparatus and method for quantizing image data.

BACKGROUND OF THE INVENTION

When a printer such as an ink-jet printer, the number of tones that can output is limited, is used, the number of tones of image data is reduced to that the printer can express by a quantization process by means of a printer driver on a host computer, and that image data is then transferred from the host computer to the printer.

The size of image data to be transferred increases and the time required for transferring image data from the host computer to the printer increases with increasing resolution of printer, resulting in a low print throughput. In such case, the following method may be used. That is, the printer driver sends only tone information of a density pattern using a density pattern method, and the printer converts the received tone information into dots. In this method, the data size can be smaller than that of binary data to be directly transferred from the host computer to the printer. For example, when the resolution of a printer is 600 dpi, and a unit density pattern is formed by collecting a total of four dots to be output from the printer, i.e., 2 vertical dots×2 horizontal dots, five tones can be expressed, as shown in FIG. 1. That is, when the printer driver executes a 5-valued quantization process for 300-dpi pixel information, and sends its tone information alone to the printer, it can make the printer output a pseudo continuous tone image.

When image data is transferred from the host computer to the printer by the aforementioned method, the aforementioned 5-valued quantization data is expressed by quantization codes each having a given bit length, and the quantization codes are packed to undergo data transfer. In terms of this packing process (since data transfer is done in units of 8 or 16 bits), the bit length of each quantization code is 2, 4, or 8 bits, and a 4-bit quantization code is used in case of the 5-valued quantization data. Therefore, since this quantization data has only tone information for five values with respect to 16 tones that 4 bits can express, it becomes information with very high redundancy.

Even such highly redundant information, which expresses five tones using 4 bits, can be used while the data transfer rate or the memory size of the printer has a large margin. However, as the printer requires higher resolution and higher speed, the data transfer rate and the data size that the printer can hold pose a problem. That is, when highly redundant information that expresses five tones using 4 bits is transferred to the printer, this results in very poor efficiency.

In order to combat this problem without changing the unit density pattern, when the number of tones is reduced from five values to four values, the quantization code can be expressed by 2 bits. However, a reduction of the number of tones leads to loss of tone information, production of false contours, an increase in granularity, and the like, thus deteriorating the image quality of an output image.

SUMMARY OF THE INVENTION

The present invention has been made to solve the aforementioned problems, and has as its object to generate quantization data with low redundancy by quantizing image data without deteriorating image quality.

In order to achieve the above object, a preferred embodiment of the present invention discloses an image processing apparatus comprising: quantization means for quantizing multi-valued image data into N-valued data (where N is a natural number), and outputting the N-valued data as a K-bit code (where K is a natural number) that can express the N values; conversion means for combining and converting K-bit codes for M pixels (where M is a natural number) into an L-bit code (where L<M×K); and output means for packing and outputting data output from said conversion means into data of a predetermined bit unit.

Also, there is disclosed an image processing method comprising the steps of: quantizing multi-valued image data into N-valued data (where N is a natural number), and outputting the N-valued data as a K-bit code (where K is a natural number) that can express the N values; combining and converting K-bit codes for M pixels (where M is a natural number) into an L-bit code (where L<M×K); and packing and outputting data output from the conversion step into data of a predetermined bit-unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing an example of a conversion table of an LUT shown in FIG. 4;

FIG. 12 is a block diagram showing the arrangement of an image processor according to the fourth embodiment of the present invention; and FIG. 13 is a view showing an example of density patterns in the fourth embodiment.

DESCRIPTION OF THE PREFERRED EMBODIMENTS

An image processing apparatus according to an embodiment of the present invention will be described in detail hereinafter with reference to the accompanying drawings.

First Embodiment (Arrangement)

Figure 2:
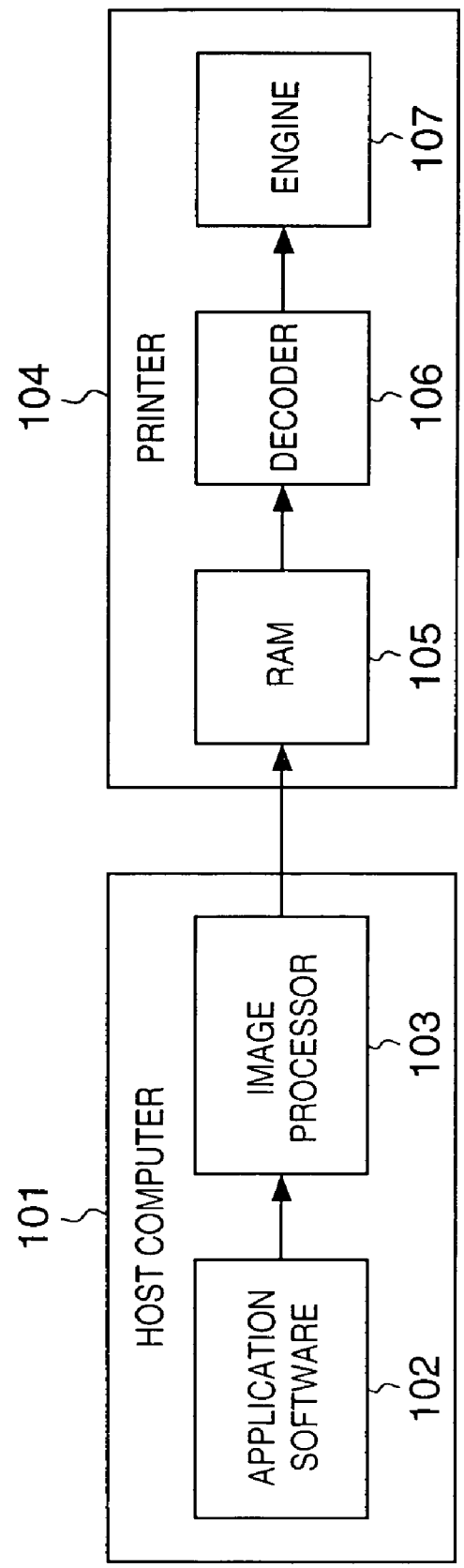
FIG. 2 is a block diagram showing the arrangement of an image processing system according to the first embodiment of the present invention.

FIG. 2 is a block diagram showing the arrangement of an image processing system according to this embodiment.

Application software 102, which runs on a host computer 101 and is used to create and edit an image, outputs image data of the created and/or edited image to an image processor 103. Image data output from the application software 102 is 8-bit multi-valued data per color of R, G, and B or C, M, Y, and K if an image is a continuous tone image.

The image processor like a printer driver which runs on the host computer 101 executes a quantization process, compression process, and the like of the input image data, thus generating image data to be transferred to a printer 104 such as an ink-jet printer.

The image data input to the printer 104 is stored in a RAM 105. Since the image data stored in the RAM 105 has been compressed by the image processor 103, it is expanded to image data to be printed by a decoder 106. The expanded image data is sent to an engine 107, thus forming and outputting an image based on the image data.

(Image Processor)

Figure 3:
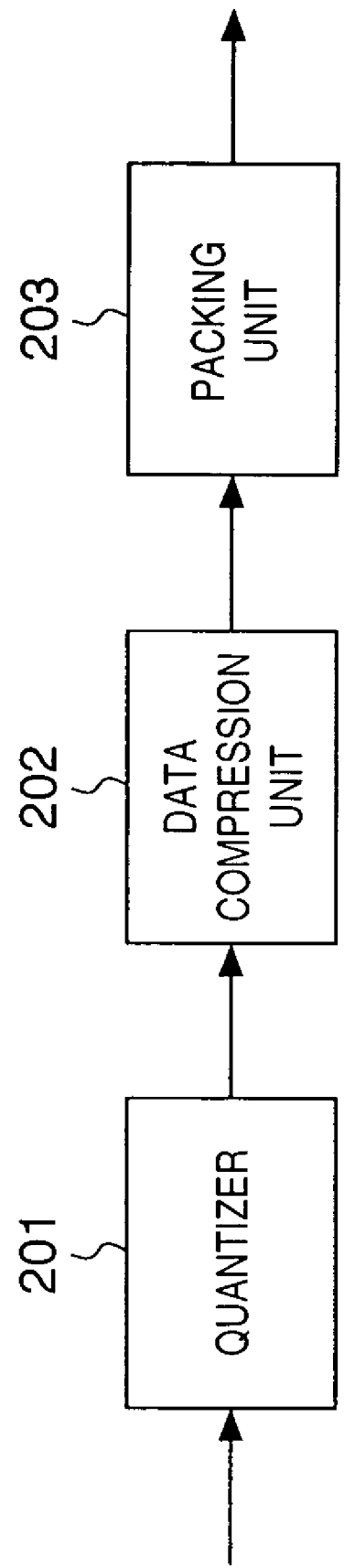
FIG. 3 is a block diagram showing the arrangement of an image processor shown in FIG. 1.

FIG. 3 is a block diagram showing the arrangement of the image processor 103.

A quantizer 201 converts input multi-valued (e.g., 8 bits, 256 tones per color) image data into N-valued image data per C, M, or Y, or C, M, Y, or K. In this embodiment, a case will be explained wherein N=5, i.e., 5-valued quantization is done. Also, since pseudo halftoning is done to correct quantization errors produced upon quantization, the image finally output has continuous tone. As pseudo halftoning, known error diffusion, dithering, or the like is used.

A data compression unit 202 inputs the quantized data in units of pixels. In this embodiment, since image data is quantized to 5-valued data, quantized data has 4 bits per pixel. This data of 4 bits per pixel is compressed to data of 8 bits per three pixels by a compression process (to be described later) of the data compression unit 202, and the compressed data is sent to a packing unit 203.

The packing unit 203 packs the compressed data input from the data compression unit 202 into a transfer unit from the host computer 101 to the printer 104. For example, when data transfer from the host computer 101 to the printer 104 is done in units of 16 bits, two 8-bit compressed data are packed into 16-bit data.

(Data Compression Unit)

Figure 4:
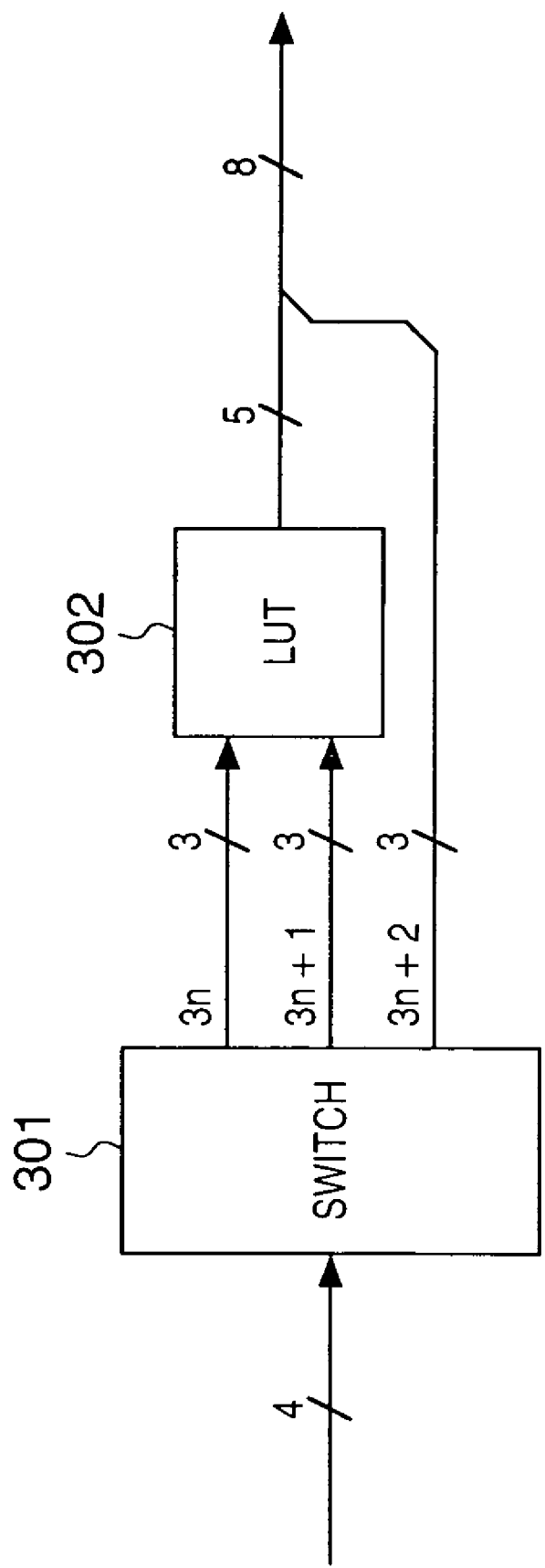
FIG. 4 is a block diagram for explaining the functional arrangement of a data compression unit.

FIG. 4 is a block diagram for explaining the functional arrangement of the data compression unit 202.

Figure 5:
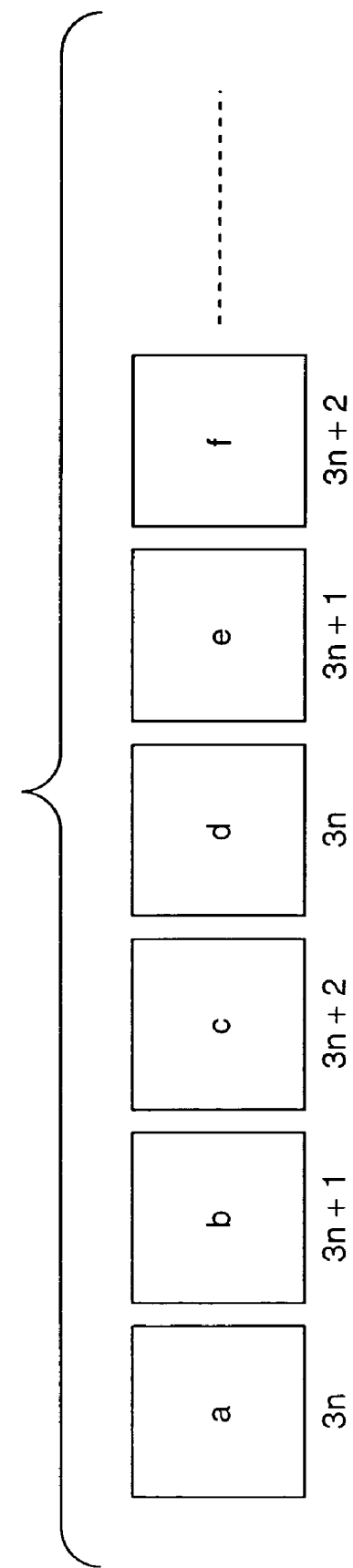
FIG. 5 is a view for explaining the process of the data compression unit.

A switch 301 receives 4-bit pixel data, which has been quantized to 5-valued data, in units of pixels, and separately outputs the received pixel data at three pixel cycles 3n, 3n+1, and 3n+2, as shown in FIG. 5. In the example shown in FIG. 5, pixels a and d are distributed and output as (3n)-th pixels; pixels b and e as (3n+1)-th pixels; and pixels c and f as (3n+2)-th pixels. Although each pixel data is 4-bit data, since five values can be expressed by, e.g., "0000", "0001", "0010", "0011", and "0100", upper 1 bit is not necessary. For this reason, the bits to be output from the switch 301 can be three bits.

The (3n)-th and (3n+1)-th pixel data of those distributed to three pixel cycles are input to a look-up table (LUT) 302 and are converted into 5-bit data in accordance with a table example shown in FIG. 6. As a result, the number of bits of data is reduced by one, but no information is omitted. This is because since 3-bit data for one pixel has only information for five values, there are only 5×5=25 different pieces of information even when data for two pixels are combined. Furthermore, this 5-bit data and 3-bit data as the (3n+2)-th pixel data are combined, and the combined data is output from the data compression unit 202 as 8-bit information.

Figure 7:
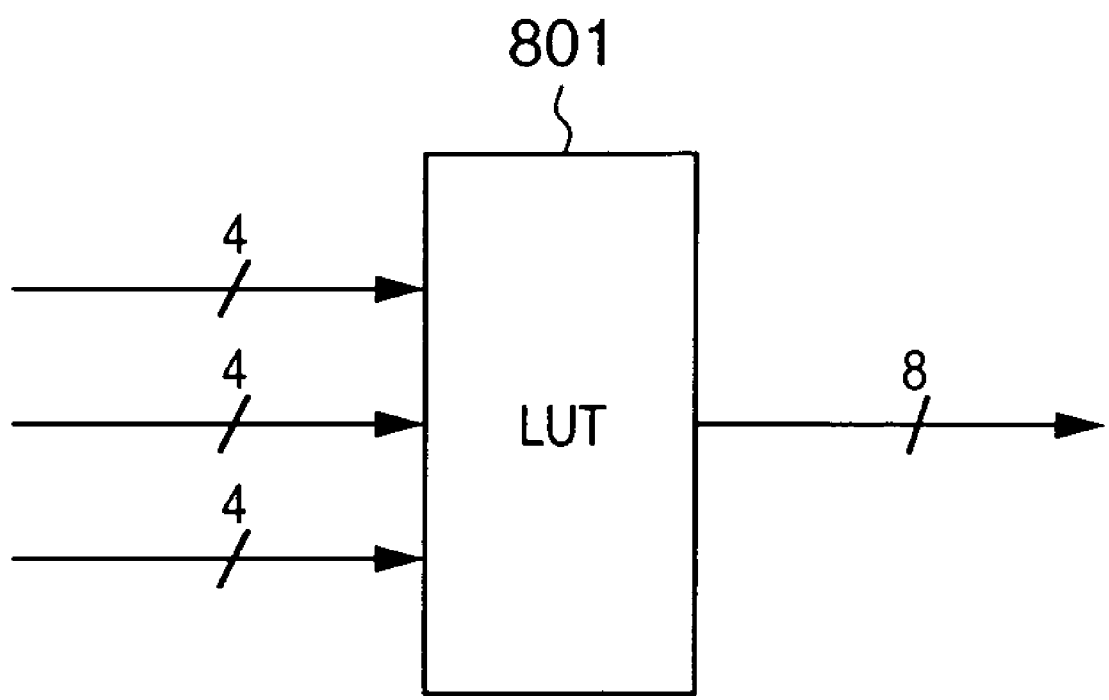
FIG. 7 is a block diagram showing another arrangement of a data compression unit shown in FIG. 3.

The arrangement of the data compression unit 202 is not limited to that shown in FIG. 4, but the arrangement shown in FIG. 7 may be used. That is, all 4-bit data for three pixels may be input to an LUT 801 and converted into 8-bit data. When a process is done by software such as a printer driver, the arrangement shown in FIG. 6 can make the processing load lighter.

(Decoder)

The compressed image data is transferred to the printer 104 and is stored in the RAM 105. The decoder 106 decodes (expands) image data stored in the RAM 105 in synchronism with the image formation timing of the engine 107.

Figure 8:
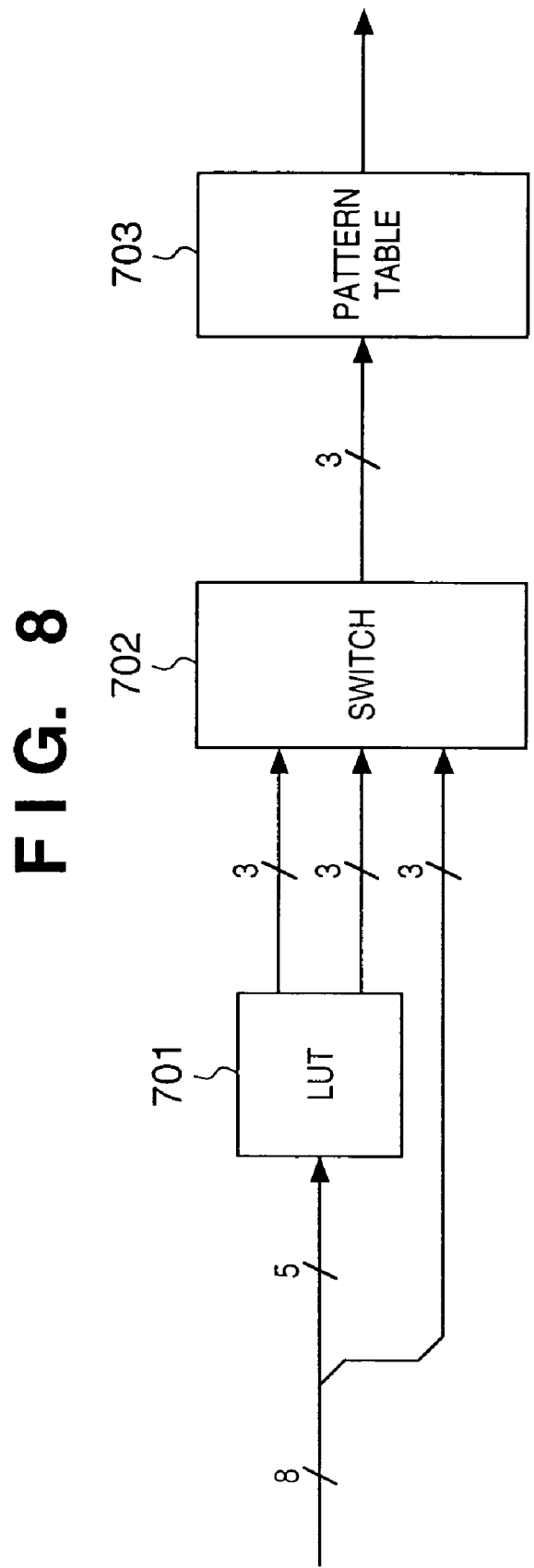
FIG. 8 is a block diagram showing the arrangement of a decoder shown in FIG. 2.

FIG. 8 is a block diagram showing the arrangement of the decoder 106.

Figure 1:
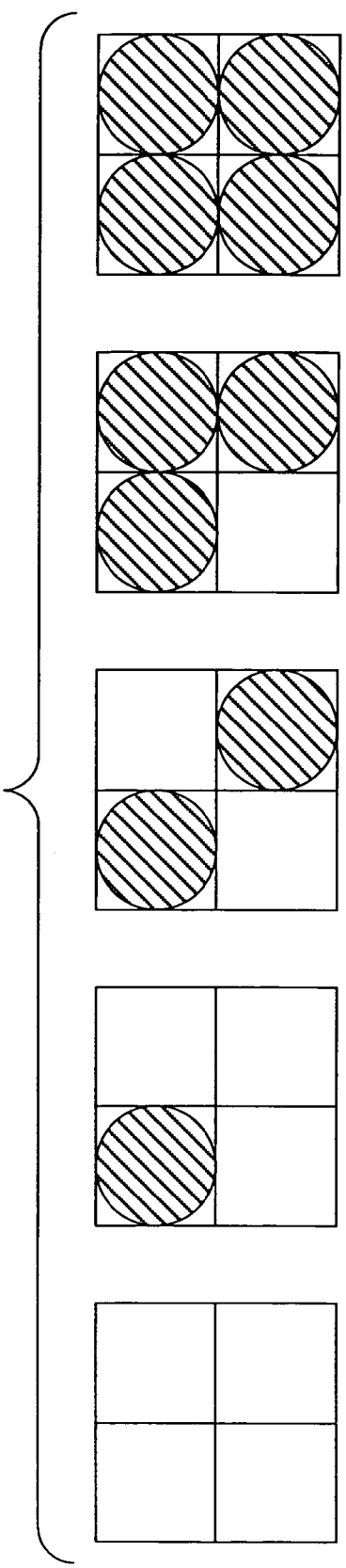
FIG. 1 is a view showing an example of density patterns.

The decoder 106 basically executes a process opposite to that of the data compression unit 202 shown in FIG. 4. That is, 5-bit data extracted from the input 8-bit data is input to an LUT 701 that makes inverse conversion to that of the LUT 302 of the data compression unit 202 to be converted into 3-bit pixel data for two pixels. The pixel data for two pixels output from the LUT 701, and the remaining 3-bit data of the 8-bit data are input together to a switch 702 to restore pixel data for three successive pixels. Finally, the pixel data output from the switch 702 is supplied to a pattern table 703 to generate five different dot patterns shown in FIG. 1.

As described above, according to the first embodiment, 4-bit information per pixel is compressed to 8-bit data per three pixels, and the compressed data is sent to the printer 104 and stored in the RAM 105. Hence, image data to be transferred and stored in the RAM 105 is 8/3=2.67 bits per pixel, and efficient data transfer and storage can be realized. According to the compression method of this embodiment, since image data undergoes lossless compression, it is free from any omission of information resulting from lossy compression such as JPEG or the like, and is also free from any deterioration of image due to compression.

Second Embodiment

An image processing apparatus according to the second embodiment of the present invention will be described below. Note that the same reference numerals in this embodiment denote the same parts as in the first embodiment, and a detailed description thereof will be omitted.

Figure 9:
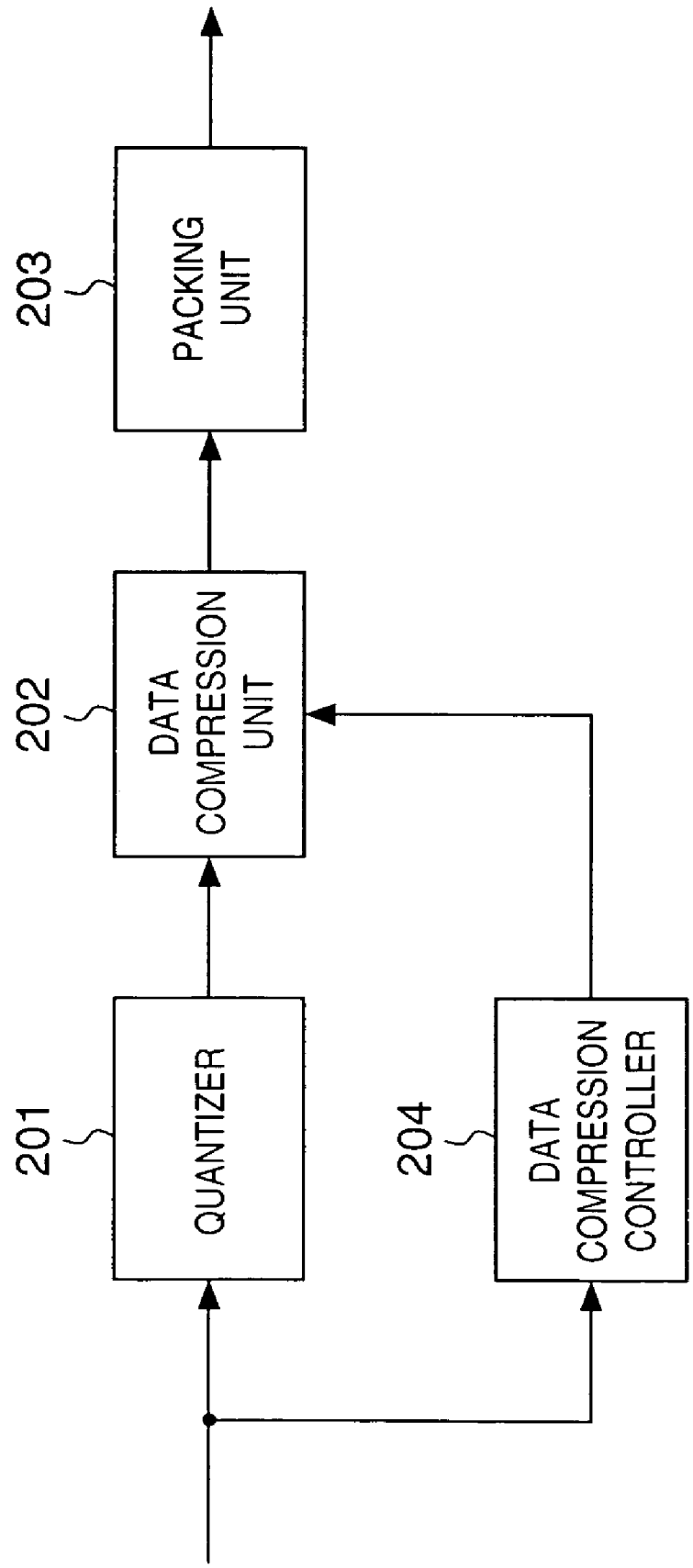
FIG. 9 is a block diagram showing the arrangement of an image processor according to the second embodiment of the present invention.

In the second embodiment, the compression process of the data compression unit 202 described in the first embodiment is ON/OFF-controlled depending on image data. FIG. 9 is a block diagram showing the arrangement of the image processor 103 of the second embodiment. In FIG. 9, a data compression controller 204 is added to the arrangement of the first embodiment shown in FIG. 3. The data compression controller 204 computes the memory size that the printer 104 requires for processing on the basis of, e.g., the size of image data input to the image processor 103. When the memory size that the printer 104 can use is smaller than the required memory size, the data compression controller 204 controls image data to pass through the data compression unit 202 without any compression process.

Figure 10:
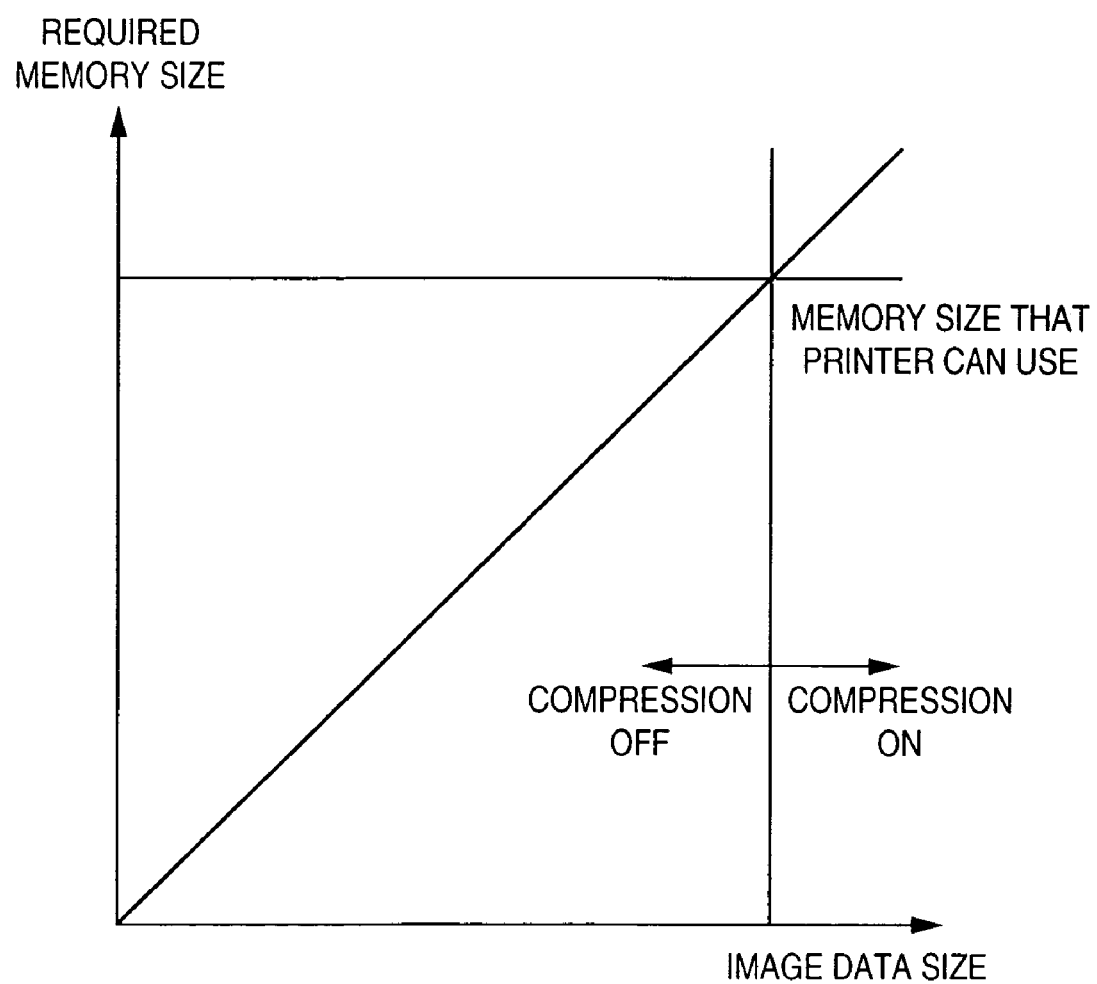
FIG. 10 is a graph for explaining the relationship among the image data size, required memory size, available memory size, and ON/OFF state of a compression process.

FIG. 10 is a graph for explaining the relationship among the image data size, required memory size, available memory size, and ON/OFF state of the compression process. Note that the border line of ON/OFF of the compression process may be fixed in accordance with the memory size that the printer 104 can use or may dynamically change on the basis of information obtained from the printer 104.

The reason why such process is required will be briefly explained. In a serial printer such as an ink-jet printer, the print speed changes largely depending on the image data size, and the processing speed required for the host computer 101 also changes. Hence, when the compression process is kept ON irrespective of the image data size, the load on the compression process is large when the image data size is small, and data transfer from the host computer 101 cannot often catch up with the print speed of the printer 104. If the image data size is originally small, since such data need not be compressed in consideration of the memory size of the RAM 105 of the printer 104, the compression process of the data compression unit 202 is preferably turned off so as not to increase the processing load on the image processor 103.

As described above, according to the second embodiment, since the compression process of the image processor 103 is ON/OFF-controlled depending on the image data size, efficient data transfer and storage can be realized in case of a relatively large data size, and an increase in processing load due to the compression process can be suppressed in case of a relatively small data size.

Third Embodiment

An image processing apparatus according to the third embodiment of the present invention will be explained below. Note that the same reference numerals in this embodiment denote the same parts as in the first embodiment, and a detailed description thereof will be omitted.

Figure 11:
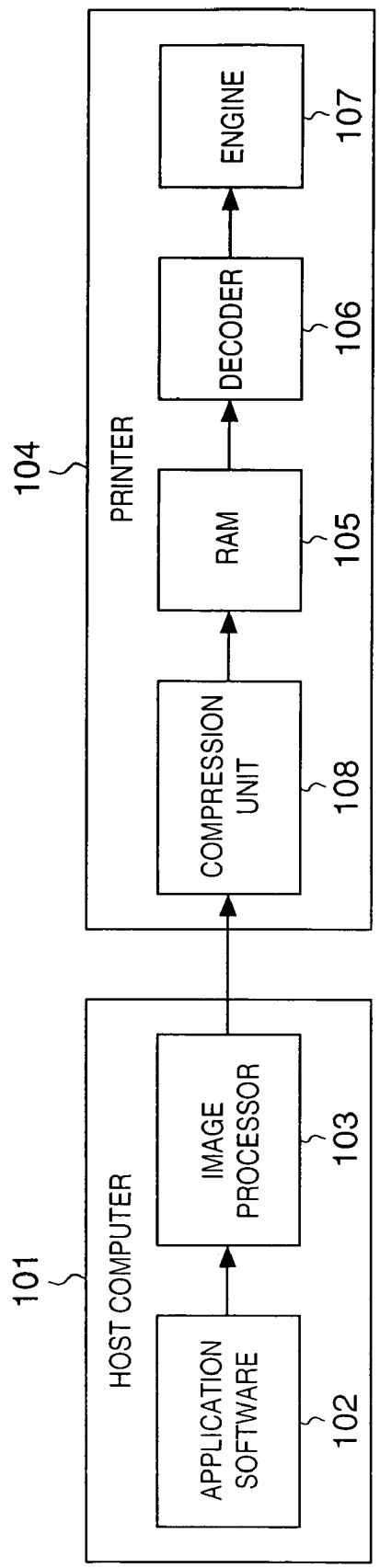
FIG. 11 is a block diagram showing the arrangement of an image processing system according to the third embodiment of the present invention.

The data compression process in the first embodiment is done on the host computer 101 side. By contrast, the data compression process in the third embodiment is done on the printer 104 side. FIG. 11 is a block diagram showing the arrangement of an image processing system according to the third embodiment.

In the third embodiment, since the host computer 101 does not perform any compression, the quantized image data is directly transferred from the image processor 103 to the printer 104. Hence, in the example explained in the first embodiment, 4-bit image data that has been quantized to 5-valued data is directly transferred to the printer 104. The image data input to the printer 104 is compressed by a compression unit 108 by the same method as that described in the first embodiment, and the compressed data is stored in the RAM 105.

According to the third embodiment, since both the compression and expansion processes of image data are done on the printer 104 side, the compression process required for the image processor 103, and the memory size require for data storage at that time can be reduced. Hence, the processing load can be prevented from increasing due to the compression process in the host computer 101, and hence, low print throughput can be avoided.

Fourth Embodiment

An image processing apparatus according to the fourth embodiment of the present invention will be explained below. Note that the same reference numerals in this embodiment denote the same parts as in the first embodiment, and a detailed description thereof will be omitted.

In the fourth embodiment, in particular, to reduce the data size when a color image is output, coarse quantization is done for a color in which quantization errors hardly stand out, and data compression is done for a color in which quantization errors readily stand out.

When a color image is formed by an image output apparatus represented by an ink-jet printer, a color image is formed by mixing four different color inks such as cyan, magenta, yellow, and black. For this reason, the use ratios of inks are determined in correspondence with input image data in a color conversion process in the image process, and image data is quantized in units of colors.

FIG. 12 is a block diagram showing the arrangement of an image processor of the fourth embodiment. For example, RGB 24-bit color image data output from the application software 102 is input to a color processor 205, and is color-separated into multi-valued (e.g., 8 bits) data of four colors, i.e., cyan, magenta, yellow, and black (to be abbreviated as C, M, Y, and K hereinafter). Each color data is input to a corresponding quantizer 201C, 201M, 201K, or 201Y, and is independently quantized.

Of four, C, M, Y, and K colors, Y dots are very hard to see for the human eye. Hence, even when coarse quantization is done for Y image data, quantization errors of a Y component image formed hardly stand out. Hence, exploiting this nature, five tones expressed by 2×2 dots are used for three, C, M, and K colors, and Y is expressed by four tones by decreasing one gray level, as shown in FIG. 13. Hence, C, M, and K image data are quantized to 5-valued data by the quantizers 201C, 201M, and 201K, the quantized data undergo the same data compression process as in the first embodiment by data compression units 202C, 202M, and 202K, and the compressed data are input to the packing unit 203. On the other hand, Y image data is quantized to 4-valued data by the quantizer 201Y. Since 4-valued data can be expressed by 2 bits, the Y image data is sent to the packing unit 203 without being compressed.

According to the fourth embodiment, exploiting the nature that respective color components have different influences on image quality, data compression is selectively done for some color components. Hence, the processing load of the overall image process can be reduced, and the influence on image quality can be minimized.

Note that the fourth embodiment can be combined with not only the arrangement of the first embodiment, but also that of the second embodiment.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
   a quantization section, arranged to quantize, in each pixel, multi-valued image data into N-valued data (where N is a natural number), and output the N-valued data as a K-bit code (where K is a natural number) that can express the N values;
   a converter, arranged to combine and convert K-bit codes for M pixels (where M is a natural number) into an L-bit code (where L<M×K); and
   an output section, arranged to pack data converted by said converter into data of a predetermined number of bits, and output the packed data.

2. The apparatus according to claim 1, wherein the predetermined number of bits is equal to that data which is to be transferred to an image forming apparatus.

3. The apparatus according to claim 2, further comprising a controller arranged to compute a memory size that the image forming apparatus requires for a process, and to control said converter in accordance with the computation result.

4. The apparatus according to claim 3, wherein said controller controls said converter in a through pass state when the computed memory size required for the process is smaller than a memory size that the image forming apparatus can use.

5. The apparatus according to claim 1, wherein said quantization section and said converter execute processes according to color components of the image data.

6. The apparatus according to claim 5, wherein said quantization section quantizes image data of a color component in which a quantization error readily stands out to the N-valued data, and quantizes image data of a color component in which a quantization error hardly stands out to N'-valued data (where N'<N).

7. The apparatus according to claim 6, wherein said converter does not convert the image data of the color component in which the quantization error hardly stands out.

8. An image processing method, comprising the steps of:
   quantizing, in each pixel, multi-valued image data into N-valued data (where N is a natural number), and outputting the N-valued data as a K-bit code (where K is a natural number) that can express the N values;
   combining and converting K-bit codes for M pixels (where M is a natural number) into an L-bit code (where L<M×K);
   packing data converted in the conversion step into data of a predetermined number of bits; and
   outputting the packed data.

9. The method according to claim 8, wherein the predetermined number of bits is equal to that data which is to be transferred to an image forming apparatus.

10. The method according to claim 9, further comprising the step of computing a memory size that the image forming apparatus requires for a process, and controlling the conversion step in accordance with the computation result.

11. The method according to claim 10, wherein the control step includes the step of controlling the conversion step in a through pass state when the computed memory size required for the process is smaller than a memory size that the image forming apparatus can use.

12. The method according to claim 8, wherein the quantization step and the conversion step execute processes according to color components of the image data.

13. The method according to claim 12, wherein the quantization step includes the step of quantizing image data of a color component in which a quantization error readily stands out to the N-valued data, and quantizing image data of a color component in which a quantization error hardly stands out to N'-valued data (where N'<N).

14. The method according to claim 13, wherein the conversion step includes the step of skipping conversion of the image data of the color component in which the quantization error hardly stands out.

15. A computer program product stored on a computer readable medium and comprising a computer program code for an image processing method, the method comprising the steps of:
   quantizing, in each pixel, multi-valued image data into N-valued data (where N is a natural number), and outputting the N-valued data as a K-bit code (where K is a natural number) that can express the N values;
   combining and converting K-bit codes for M pixels (where M is a natural number) into an L-bit code (where L<M×K);
   packing data converted in the conversion step into data of a predetermined number of bits; and
   outputting the packed data.

16. An image processing apparatus comprising:
   a quantization section, arranged to quantize, in each pixel, multi-valued image data into N-valued data (where N is a natural number), and output a K-bit code capable of expressing the N values;
   a converter, arranged to collect K-bit codes for M pixels (where M is a natural number), and convert the collected K-bit codes into an L-bit code (where L<M×K); and
   an output section, arranged to pack the L-bit code and the N-valued data into data of a predetermined number of bits, and output the packed data.

17. A computer-readable storage medium comprising a program for implementing a printer driver, said driver comprising:

a quantization module which quantizes, in each pixel, multi-valued image data into N-valued data (where N is a natural number), and outputs a K-bit code capable of expressing the N values;

a conversion module which collects K-bit codes for M pixels (where M is a natural number), and converts the collected K-bit codes into a L-bit code (where $L<M\times K$);

a packing module which packs the L-bit code and the N-valued data into data of a predetermined number of bits; and an output module which outputs the packed data.

18. The apparatus according to claim 2, wherein the image forming apparatus prints an image on the basis of data received from the image processing apparatus, and said image forming apparatus comprises:

a separator, arranged to separate the received data into compressed code of a first predetermined number of bits and uncompressed code of a second predetermined number of bits;

a restorer, arranged to restore the separated compressed code to a plurality of the uncompressed code; and a print section, arranged to print an image using the separated and restored uncompressed code.

19. The apparatus according to claim 6, wherein the color component in which the quantization error readily stands out is a cyan, magenta, or black component.

20. The apparatus according to claim 6, wherein the color component in which the quantization error hardly stands out is a yellow component.

* * * * *